United States Patent [19]

Ohashi et al.

[11] 4,292,369
[45] Sep. 29, 1981

[54] FIREPROOF LAMINATES

[75] Inventors: Takashi Ohashi, Iruma; Toru Okuyama, Sagamihara; Katsuhiko Arai, Akigawa; Hiroshi Kaneda, Higashimurayama, all of Japan

[73] Assignee: Bridgestone Tire Company Limited, Tokyo, Japan

[21] Appl. No.: 127,668

[22] Filed: Mar. 6, 1980

[30] Foreign Application Priority Data

Mar. 6, 1979 [JP] Japan .................................. 54-26043
Nov. 30, 1979 [JP] Japan ................................ 54-154196

[51] Int. Cl.³ .............................................. B32B 5/20
[52] U.S. Cl. .................................. 428/313; 428/422.8; 428/920; 428/921
[58] Field of Search ................. 521/902; 428/313, 315, 428/464, 465, 920, 921, 422.8

[56] References Cited

U.S. PATENT DOCUMENTS

| 2,226,589 | 12/1940 | Smyers | 428/465 |
| 2,728,702 | 12/1955 | Simon et al. | 156/242 |
| 3,814,659 | 6/1974 | Nadeau | 428/313 |
| 3,940,517 | 2/1976 | De Leon | 521/902 |
| 4,118,533 | 10/1978 | Hipchen et al. | 428/313 |
| 4,121,958 | 10/1978 | Koonts | 428/314 |
| 4,131,518 | 12/1978 | Fromson | 428/464 |
| 4,148,980 | 4/1979 | Narayan | 521/902 |
| 4,165,414 | 8/1979 | Narayan et al. | 521/902 |
| 4,166,164 | 8/1979 | Cenker et al. | 521/902 |
| 4,205,136 | 5/1980 | Ohashi et al. | 428/315 |

FOREIGN PATENT DOCUMENTS 900876 7/1962 United Kingdom ............... 428/315

OTHER PUBLICATIONS

UK Patent Application GB 2,007,590 A, Published May 23, 1979, 428-313.

Primary Examiner—William J. Van Balen
Attorney, Agent, or Firm—Sughrue, Mion, Zinn, Macpeak and Seas

[57] ABSTRACT

A fireproof laminates passing Grade 2 incombustibility according to Japanese Industrial Standard (JIS) A-1321 combustion test is disclosed. The laminate comprises a urethane modified polyisocyanurate foam as a core material and a particular front surface material piled on the core material through self-adhesion of the foam.

15 Claims, 2 Drawing Figures

FIREPROOF LAMINATES

This invention relates to novel fireproof laminates using a urethane modified polyisocyanurate foam as a core material.

The fireproof laminates according to the invention are characterized by having a fireproof property passed Grade 2 incombustibility (quasi-incombustible material) in a test for incombustibility of internal finish materials for buildings according to Japanese Industrial Standard (JIS) A-1321.

Recently, demands for weight-saving, easiness of processability, thermal insulating property and the like in building materials are promptly elevated with the high rising and assembling of buildings. Furthermore, flameproofing regulation for the building materials becomes strengthened with the increase of dangers in the firing. Moreover, the use of quasi-incombustible materials is not only obligated in given sections of detached house, multiple dwelling house and the like by the building regulation, but also abruptly increases in other sections.

As the building materials such as ceiling material, wall material and others, there have hitherto been used ones obtained by using woody part, gypsum or the like as a core material and piling a decorative paper, iron plate or other surface material on a side thereof through an adhesive. However, such building materials are large in the specific gravity and heavy in the weight even in the case of using them as quasi-incombustible material, so that they have such drawbacks that the processability is poor, the thermal insulating property is low, the hygroscopicity is large and the dimensional stability changes considerably with time.

Lately, there have been proposed building materials manufactured by using as a substrate a foamable resin for rigid polyurethane foam, polyisocyanurate foam or the like, which are advantageous in the thermal insulating property and weight-saving, admixing or filling the foamable resin layer with a great amount of a flame retardant, a smoke-suppressing agent, inorganic granules or the like, and laminating the foam as a core material with a relatively thick and heavy steel plate such as colored iron plate and the like as a surface material, a few of which are known as a so-called incombustible building panel. However, it can be said that these panels are unsuitable in the weight-saving and easiness of processability. On the other hand, according to JIS A-1321 "Tested method for incombustibility of internal finish material and procedure of buildings" in the recently revised building regulation, the laminates each composed of the core material and the surface material for use in the ceiling material, wall material and the like are subjected to annexed test and smoke test for toxicity of combustion gases under severe conditions as well as the conventional surface test in order to examine whether or not they pass Grade 2 incombustibility (as quasi-incombustible material). As a result, the extreme restriction for the thickness of the laminate may be required even in the case of using the above mentioned panels in order to pass the laminate through the annexed test. Therefore, these panels can hardly be said to be favorable as the building material having a good thermal insulating property.

Under the above circumstances, the inventors have made various studies with respect to the development of building materials having a light weight, a good thermal insulating property and a fireproof property of Grade 2 incombustibility and as a result, there has previously been proposed a method of producing modified polyisocyanurate foams having a fireproof property of Grade 2 incombustibility (Japanese Patent laid open No. 125,498/78). However, the modified polyisocyanurate foams obtained by this method themselves are light-weight and have an excellent thermal insulating property, but are insufficient in the appearance, strength and dimensional stability at moisture absorption for direct use in the building material. Now, the inventors have further made various studies with respect to laminates obtained by using the above modified polyisocyanurate foam as a core material, piling a lightweight decorative paper, sheet or film of plastics such as vinyl chloride resin and the like, mineral paper such as asbestos paper and the like, or an aluminum foil as a surface material on the core material through self-adhesion of the modified polyisocyanurate foam. As a result, there has also been proposed laminates for use in the building material, which improve the above drawbacks of the prior art and have a satisfactory fireproof property by using an aluminum foil or sheet with a thickness of not less than 0.1 mm as a surface material (Japanese Patent laid open No. 68,884/79). However, it has been confirmed that such laminates are not necessarily said to satisfy all requirements for the building material because the surface material used becomes expensive and there are caused problems in the processing such as requirement of special equipments for cutting and the like due to the large strength of the surface material.

With the foregoings in mind, the inventors have made further investigations with respect to the fireproof laminates and as a result, the invention has been accomplished. That is, the invention is to provide novel fireproof laminates useful as the building material, which are light weight and favorable in the processability and economy and have an excellent appearance as an internal finish material, a good thermal insulating property and a fireproof property of Grade 2 incombustibility according to JIS A-1321 combustion test.

According to a first aspect of the invention, there is provided a fireproof laminates comprising a urethane modified polyisocyanaurate foam as a core material and a surface material piled on at least front side of the foam, which comprises:

(1) using an aluminum foil with a thickness of not less than 0.015 mm as a front surface material for said core material, said surface material being united with said core material by self-adhesion of said urethane modified polyisocyanurate foam; and (2) lying a matted or woven glass fiber at the interface between said core material and said front surface material.

That is, the invention makes it possible to provide laminates useful as the building material, which are light in the weight and excellent in the thermal insulating property, processability, appearance, economy and the like and have a fireproof property capable of passing Grade 2 incombustibility according to JIS A-1321 combustion test, only by lying the matted or woven glass fiber at the interface between the core material and the front surface material even when using the well-known urethane modified polyisocyanurate foam, which cannot pass Grade 2 incombustibility, as the core material and the aluminum foil having a thickness as thin as less than 0.1 mm, which does not pass Grade 2 incombustibility and has never been used in the prior art, as the front surface material. This fact is never anticipated from the prior art and is epoch-making evidently.

Heretofore, laminates manufactured by piling a surface material on at least one side of a core material composed of glass fibers and polyisocyanurate foam have been disclosed in Japanese Patent laid open No. 69,498/77 and No. 110,791/77, wherein it is characterized by uniformly dispersing glass fibers into the foam. That is, in Japanese Patent laid open No. 69,498/77, relatively short glass fibers (5–10 mm) are used. However, it is very difficult to uniformly disperse these glass fibers into the foam due to the great difference in the specific gravity between the glass fiber and the foam forming composition, so that there cannot stably be obtained products with high quality.

In Japanese Patent laid open No. 110,791/77, glass fibers of special form are used, so that it is necessary to uniformly arrange these glass fibers in the foam at a particular state and consequently there are caused problems such as the requirements of special equipment and technic in view of the processability and economic reasons.

As mentioned above, the prior art is characterized by uniformly dispersing glass fibers into the foam and does not teach the technical idea of lying the glass fiber at the interface between the core material and the surface material according to the first aspect of the invention at all. Moreover, it is confirmed that when the aluminum foil with a thickness of not less than 0.015 mm is used as the surface material, if glass fibers are uniformly dispersed into the core material as mentioned below, the glass fiber does not contribute to improve the fireproof property of the resulting laminate. The first aspect of the invention is characterized by lying the glass fibers at the interface between the core material and the surface material, so that there is not required the uniform dispersing of the glass fiber into the foam as in the prior art and as a result, the laminates with a high quality can stably be obtained without requiring the special equipment and technic necessary for removing the defects due to the ununiform dispersion. Furthermore, the thus obtained laminates pass Grade 2 incombustibility according to JIS A-1321 combustion test, which has never been achieved in the prior art, so that the construction and effect thereof are not completely anticipated from the prior art.

According to a second aspect of the invention, there is provided a fireproof laminate comprising a urethane modified polyisocyanurate foam as a core material and a surface material piled on at least front side of the foam, which comprises using as the front surface material for said core material a three-layer assembly composed of aluminum foils with a thickness of less than 0.1 mm as upper and lower layers and a matted or woven glass fiber as a middle layer, said front surface material being united with said core material through said lower layer by self-adhesion of said foam.

According to the second aspect of the invention, it makes possible to provide laminates useful as the building material, which are light in the weight and excellent in the thermal insulating property, processability, appearance, economy and the like and have a fireproof property capable of passing Grade 2 incombustibility according to JIS A-1321 combustion test, only by using the urethane modified polyisocyanurate foam having a low density and an excellent thermal insulating property as the core material and the above defined three-layer assembly, which is lighter in weight than the steel plate usually used, as the front surface material. This fact is never anticipated from the prior art and is epoch-making evidently.

The invention will be described in greater detail below.

The urethane modified polyisocyanurate foam to be used as the core material is produced by polymerizing and foaming an organic polyisocyanate with a polyol in the presence of a blowing agent, an isocyanate trimerization catalyst and if necessary, other additives such as a surfactant and the like.

The organic polyisocyanate to be used in the invention means an organic compound having two or more isocyanate groups in its molecule and includes aliphatic polyisocyanates, aromatic polyisocyanates, mixtures and modified substances thereof. As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, bitolylene diisocyanate, naphthalene diisocyanate (e.g., 1,5-naphthalene diisocyanate), triphenylmethane triisocyanate, dianisidine diisocyanate, xylylene diisocyanate, tris-(isocyanate phenyl)thiophosphate, polymethylene-polyphenyl isocyanate having the following formula wherein n is 0 or an integer of 1 or more (so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional methods, for example, prepolymers having an urethane group, a biuret group, an isocyanate group, a carbodiimide group, an oxazolidone group or the like may be used. These polyisocyanates may be used alone or in admixture of two or more polyisocyanates. As the organic polyisocyanate, the aromatic polyisocyanates, particularly polymethylene-polyphenyl isocyanates are preferable in view of flameproofing and thermal insulating property.

The polyols to be used in the invention are compounds each having two or more hydroxyl groups at its terminal, which may be used alone or in admixture of two or more compounds. As the polyol, there are polyether polyols, an example of which includes polyhydric alcohols such as ethylene glycol, propylene glycol, butylene glycol, hexylene glycol, diethylene glycol, dipropylene glycol, glycerin, hexane triol, pentaerythritol, trimethylol propane, methyl glucoside, sorbitol, sucrose and the like and/or addition products with an alkylene oxide thereof; an addition product of a polyamine such as ammonia, ethylene diamine, diethylene triamine, tolylene diamine or the like with an alkylene oxide; a phosphorus containing polyol such as an addition product of phosphoric acid with an alkylene oxide and the like; an addition product of a phenol such as bisphenol A or the like with an alkylene oxide; an addition product of an intermediate having a phenolic hydroxyl group such as novolac resin, resol resin or the like with an alkylene oxide and so on.

Further, the polyol includes polyester polyols having hydroxyl groups at terminals thereof, which are obtained by polycondensation reaction of an aliphatic carboxylic acid such as malonic acid, succinic acid, adipic acid, pimelic acid, sebacic acid and the like or an aromatic carboxylic acid such as phthalic acid and the like or a mixture thereof with an aliphatic glycol such as ethylene glycol, propylene glycol, butylene glycol, diethylene glycol and the like or a triol such as trimethylol propane and the like; polyester polyols having hydroxyl groups at terminals thereof such as polycaprolactone obtained by ring opening polymerization of lactone, and the like. The object of the invention can be achieved even when using any kind of the polyol in any amount to the organic polyisocyanate, but the effect of the invention can be more developed when using the polyols in the following ranges.

That is, it is preferable to use the polyol selected from combinations of a low molecular weight diol having a hydroxyl equivalent of not more than 100 with at least one high molecular weight polyol having 2 to 4 hydroxyl groups in its molecule in such a manner that the weight ratio of the low molecular weight diol to the high molecular weight polyol is within a range of 0.55 to 7.0 and the total amount of the diol and polyol used is within a range of 12.5 to 25 parts by weight per 100 parts by weight of the organic polyisocyanate. As the low molecular weight diol, there is preferably used diethylene glycol, triethylene glycol, tetraethylene glycol, dipropylene glycol, tripropylene glycol, 2,3-butane diol or 2-butene-1,4-diol, while the high molecular weight polyol having 2 to 4 hydroxyl group in its molecule preferably has a hydroxyl equivalent of 600 to 2,000.

In the formation of the core material, there may be used any of well-known isocyanate trimerization catalysts, typical examples of which are as follows:

(1) Tertiary amino compounds, such as dialkylaminoalkyl phenols (e.g., 2,4,6-tris(dimethylaminomethyl)-phenol and so on), triethylamine, N,N',N"-tris(dimethylaminoalkyl)hexahydrotriazines, tetraalkylalkylene diamines, dimethylethanol amine, diazabicyclooctane or its lower alkyl substituted derivatives and the like;

(2) Combinations of tertiary amines with cocatalysts; As the cocatalyst, mention may be made of ethyl alcohol, mono-substituted carbamic acid, esters, aldehydes, alkylene oxides, alkylene imines, ethylene carbonate, 2,3-butanedione and the like.

(3) Tertiary alkyl phosphines;

(4) Alkali metal salts of imides, such as potassium phthalimide and the like;

(5) Onium compounds, such as quaternary onium hydroxyl compounds of nitrogen, phosphorus, arsenic or antimony, onium hydroxyl compounds of sulfur or selenium and the like;

(6) Alkyl substituted ethyleneimines, such as N-methyl ethyleneimine, phenyl-N,N-ethylene urea and the like;

(7) Metal salts of carboxylic acids, such as potassium acetate, potassium 2-ethyl hexanoate, lead 2-ethyl hexanoate, sodium benzoate, potassium naphthenate, potassium caprylate and the like;

(8) Oxides, hydroxides, carbonates, enolic compounds and phenolic compounds of alkali metals or alkaline earth metals;

(9) Epoxy compounds;

(10) Combinations of epoxy compounds with cocatalysts; As the cocatalyst, mention may be made of tertiary amines, metal salts of aromatic secondary amines such as sodium salt of diphenylamine and the like;

(11) Various metal salts, such as stannous octanoate, titanium tetrabutyrate, tributyl antimony oxide and the like;

(12) Friedel-Crafts catalysts, such as aluminum chloride, boron trifluoride and the like; and (13) Chelate compounds of alkali metals, such as sodium salicylaldehyde and the like.

These catalysts may be used alone or in an admixture thereof, but the alkali metal salt of carboxylic acids having a carbon number of 2–12 alone or the combination of the tertiary amino compound therewith is preferably used in view of a catalytic activity, a compatibility with the polyol and the like.

The amount of the isocyanate trimerization catalyst used is preferably 0.5–10% by weight per the organic polyisocyanate in view of the catalytic activity.

According to the invention, all of blowing agents used in the production of conventional polyurethane foams and polyisocyanurate foams may be used. For instance, the blowing agent includes carbon dioxide gas generated by adding water to the reaction mixture or supplied from an external source, nitrogen gas and a mixture thereof. However, the preferred blowing agent is a low-boiling inert solvent evaporating by a heat of reaction in the foam forming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethane is preferable as the blowing agent in view of the foam properties, easiness of foam forming process and the like. The addition amount of the blowing agent should be changed according to the desired density of the urethane modified polyisocyanurate foam as the core material, but the blowing agent is usually used in an amount of 10–40% by weight per foam forming composition.

In addition to the above mentioned ingredients, a surfactant, a modifier and other additives may be added, if necessary.

As the surfactant, use may be made of any ones usually used in the production of polyurethane foams, an example of which includes an organosilicone surfactant such as organopolysiloxane-polyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01–5 parts by weight per 100 parts by weight of the organic polyisocyanate.

As the other additive, there are inorganic hollow particles, granulated refractory, fibrous materials, inorganic fillers and the like, which are used for improving the foam properties such as hardness and the like. The inorganic filler includes mica powder, finely divided clay, asbestos, calcium carbonate, silica gel, aluminum hydroxide, calcium hydroxide, magnesium hydroxide, gypsum, sodium silicate and the like.

Moreover, a flame retardant may be added without deviating the effect of the invention. According to the invention, the flame retardant usually used in the common polyurethane foam and urethane modified isocyanurate foam is effective and includes, for example, halogenated organic phosphorus compounds such as tris(chloroethyl)phosphate, tris(dichloropropyl)phosphate, tris(dibromopropyl)phosphate and the like; and inorganic flame retardant such as antimony oxide and the like.

According to the first aspect of the invention, it is necessary to use an aluminum foil with a thickness of not less than 0.015 mm as a front surface material to be piled on the urethane modified polyisocyanurate foam as the core material. When the thickness of the aluminum foil is thicker than the above defined value, there are provided laminates satisfying all objects of the invention and capable of developing a peculiar effect. Namely, when using the aluminum foil with a thickness of less than 0.015 mm, the fireproof property is sufficient, but the appearance of the resulting laminate is considerably poor, so that this laminate is hardly said to be a practical building material. Therefore, the use of the aluminum foil having a thickness of less than 0.015 mm cannot achieve the object of the invention providing the building material having a light weight, good appearance, thermal insulating property, processability and economy and an excellent fireproof property capable of passing Grade 2 incombustibility according to JIS A-1321 combustion test. On the other hand, as the thickness of the aluminum increases, the fireproof property is further improved, but the processability and economy become poor, so that the aluminum foil having a thickness of up to about 0.2 mm is preferably used in view of practical uses.

In other words, the thickness of the aluminum foil to be used in the first aspect of the invention is within a range of 0.015 to 0.2 mm, preferably 0.02 to 0.7 mm in view of weight-saving, appearance and economic reasons. It can be said that the peculiar effect is more developed in the above defined range. As the aluminum foil, use may be made of any ones commercially available in the market, which are united with the core material by self-adhesion of the urethane modified polyisocyanurate foam as mentioned above. Further, the outer surface of the aluminum foil may be subjected to various decorations by painting, printing and the like if necessary, so as not to damage the fireproof property, or may be covered with a fabricated article previously embossed, painted or printed. Moreover, in order to improve the adhesive property between the core material and the aluminum foil, a primer or the like may be used without loss of the fireproof property.

In the first aspect of the invention, matted or woven glass fibers are lain at the interface between the core material and the front surface material. Such matted or woven glass fibers develop a satisfactory effect at a thickness of not more than 2 mm if it is intended to manufacture the laminate having a total thickness of 10–30 mm. If the thickness of the glass fibers exceeds 2 mm, it is difficult to penetrate the foam forming composition into the fibers, so that the self-adhesion of the core material to the surface material is degraded.

Besides the above matted or woven glass fibers, there are considered ones obtained by shortly cutting the fibers, i.e. so-called short fibers and milled fibers, but they cannot develop any effect for the improvement of the fireproof property because it is very difficult to disperse the later fibers into the interface between the core material and the surface material.

As the glass fibers to be used in the first aspect of the invention, there are matted ones obtained by binding relatively long monofilaments with a binder, such as Surface Mat or Filament Mat (as a trade name); Chopped Strand Mat (trade name); woven ones composed of roved glass fibers such as Roving Cloth (trade name); glass victoria lawn obtained by knitting glass fiber yarns in a lattice form, and the like. Among them, the glass victoria lawn is preferably used.

The matted or woven glass fibers are united together with the surface material to the core material by the self-adhesion of the urethane modified polyisocyanurate foam as described above.

In the second aspect of the invention, the three-layer assembly composed of an aluminum foil with a thickness of less than 0.1 mm as a middle layer and an aluminum foil with a thickness of less than 0.1 mm as a lower layer is used as a front surface material to be piled on the urethane modified polyisocyanurate foam as the core material.

As the aluminum foil, use may be made of any ones commercially available in the market, but it is necessary to have a thickness of less than 0.1 mm. If the thickness of the aluminum foils exceeds the above defined value, it is difficult to perform the cutting work and the like and also the weight-saving and economy become poor. Preferably, the aluminum foil with a thickness of from 0.02 mm to less than 0.1 mm is used as the upper layer. When using the aluminum foil with a thickness of less than 0.02 mm, there may be caused inconveniences for use in the building material because the appearance of the resulting laminate is somewhat degraded. Considering the object of the invention providing the building materials having excellent weight-saving, processability and economy, the thickness of the aluminum foil is preferably not more than 0.05 mm, which can more develop the peculiar effect.

If necessary, the outer surface of the aluminum foil as the upper layer may be subjected to various decorations by painting, printing and the like or may be covered with a fabricated article previously embossed, painted or printed, without loss of the fireproof property. On the other hand, in order to improve the adhesive property between the core material and the aluminum foil as the lower layer, a primer or the like may be used without loss of the fireproof property.

As the glass fiber to be used as the middle layer in the second aspect of the invention, use may be made of any matted or woven glass fibers commercially available in the market as previously mentioned. In view of the adhesive property between the core material and the surface material, the use of the matted or woven glass fiber having a thickness of not more than 0.5 mm is preferable. Preferably, there is used a lattice-shaped woven fiber, which is generally called as a glass victoria lawn.

The three-layer assembly is manufactured by bonding the upper, middle and lower layers one upon another with a small amount of an adhesive. As the adhesive, use may be made of polyester resins, epoxy resins, urethane resins and the like.

According to the first and second aspects of the invention, a back surface material may not be used in the back side of the core material. However, it is favorable to use the back surface material considering the deterioration of the laminate with lapse of time and the like. As the back surface material, use may be made of a metal foil such as aluminum foil or the like, a non-combustible paper such as asbestos paper or the like, a plastic film and so on. Among them, the metal foil is preferable in view of the hygroscopicity, fireproof property and the like.

In the laminates according to the invention, the laminate thickness and foam density are not critical, but it is preferable to have a laminate thickness of 10–30 mm and a foam density of 0.02–0.04 g/cm$^3$ in view of the thermal insulating property, weight-saving and economic reasons.

The reason why the laminates according to the first aspect of the invention develop an excellent fireproof property as Grade 2 incombustibility according to JIS A-1321 combustion test is guessed as follows.

That is, when the laminates composed only of the urethane modified polyisocyanurate foam as the core material and the thinner aluminum foil is subjected to a surface test according to JIS A-1321 combustion test, the aluminum foil is fused to expose the core material, whereby the thermal decomposition of the surface of the core material is promoted, and at the same time conspicuous cracks are formed from the exposed surface of the core material to the inside thereof and hence the combustion of the core material further proceeds. As a result, unfavorable phenomena such as the increase of fuming quantity, enlargement of lingering flame and the like are caused so as not to pass Grade 2 incombustibility.

On the contrary, according to the first aspect of the invention, the matted or woven glass fiber is lain at the interface between the surface material and the core material, so that even after the surface material is fused, the glass fiber shows an effect of covering the exposed surface of the core material and considerably suppresses the deformation of the core material and hence it develops the effect of preventing the formation of cracks.

As a result, the combustion quantity and fuming quantity are reduced and also the enlargement of lingering flame is suppressed, whereby the laminate according to the first aspect of the invention becomes acceptable for Grade 2 incombustibility.

In these viewpoints, it is guessed that when the glass fiber is incorporated into the inside of the core material, the covering effect against the combustion of the exposed surface is not developed and also the suppression against the proceeding of cracks toward the inside of the core material is insufficient and consequently the anticipated effect of the glass fiber is not achieved. Further, even when the laminates according to the first aspect of the invention are subjected to an annexed test, there are caused the phenomena similar to those described above, whereby the excellent fireproof property is developed.

The reason why the laminates according to the second aspect of the invention develop an excellent fireproof property as Grade 2 incombustibility according to JIS A-1321 combustion test is guessed as follows. That is, when the conventional laminate using a thin surface material such as aluminum foil is subjected to a surface test according to JIS A-1321 combustion test, a great amount of decomposition gas is generated from the core material due to the thermal decomposition of the core material by the heating, whereby the aluminum foil is bulged toward the fire source. As a result, the aluminum foil approaches to the fire source and is fused by a heat of the fire source to expose the core material, whereby there is caused a phenomenon of explosive combustion of the core material. Particularly, such a phenomenon adversely affects the suppression for the increase of fuming quantity, enlargement of lingering flame and the like.

On the contrary, according to the second aspect of the invention, the three-layer assembly composed of aluminum foil, glass fiber and aluminum foil in this order is used as the front surface material of the laminate. Therefore, when the laminate is subjected to the surface test according to JIS A-1321 combustion test, the glass fiber of the middle layer comes off from the aluminum foil to form a thermal insulating layer, whereby the propagation of heat to the core material is considerably suppressed and as a result, the amount of thermal decomposition of the core material becomes very small. Further, the glass fiber considerably prevents the bulging of the lower aluminum foil layer toward the fire source and hence the similar bulging of the upper aluminum foil layer owing to its strength. Therefore, there are caused no fusing phenomenon of the surface material by the heating and no explosive combustion of the core material, so that the laminate can exhibit the very excellent fireproof property. In other words, it can be said that the considerably excellent fireproof property according to the second aspect of the invention is developed by using the front surface material having the special three-layer structure inclusive of the glass fiber as the middle layer, which has never been anticipated in the prior art, even when using the thin aluminum foil capable of easily fusing by the heating.

The production of the fireproof laminate according to the invention can be carried out by any well-known processes. For instance, the polyol as a urethane modifier, catalyst and blowing agent are mixed with stirring by adding a foam stabilizer and other additives, if necessary, to form a homogeneous solution, to which is added the organic polyisocyanate with stirring, whereby a foam forming composition is obtained. Then, the foam forming composition is foamed in a predetermined space, which corresponds to the total thickness of the resulting laminate, of a mold or double conveyor belt having a front surface material alone or a combination with glass fibers therein so as to form a laminate composed of the core material and surface material by the self-adhesion of the resulting urethane modified polyisocyanurate foam. According to the first aspect of the invention, it is not always necessary to adhere the glass fiber to the surface material with the adhesive in the continuous production of the laminate. In this case, the glass fiber may separately be supplied by means of rolls or the like.

According to the first and second aspects of the invention, the previously formed core material may be bonded to the surface material with an adhesive without loss of the fireproof property. In this case, a great care must be taken in the selection of the adhesive.

As mentioned above, the laminates according to the invention are light weight, excellent in the thermal insulating property, processability and economy and have an excellent fireproof property passing Grade 2 incombustibility according to JIS A-1321 combustion test, so that they are advantageously applicable to various building parts for housing, building and the like.

The invention will now be described with reference to the accompanying drawings, wherein.

The following examples are given in illustration of the invention with comparative examples and are not intended as limitations thereof. In the examples, all parts and percents are by weight, unless otherwise stated.

Moreover, the effect of the invention is decided on a basis of whether or not the laminate passes Grade 2 incombustibility according to JIS A-1321 combustion test. The surface test according to JIS A-1321 is carried out by placing a test piece with a length and width of 22 cm × 22 cm and an actual thickness in a heating furnace and then heating a surface of the test piece for a predetermined period using gas as a sub-heat source and an electric heater as a main heat source. Thereafter, the presence and degree of crack/deformation, time of lingering flame after the completion of heating, heat release value (temperature time area, °C.×min.) calculated from the difference between the exhaust temperature curve of the test piece and the reference curve of perlite plate as a standard material, and fuming factor calculated from maximum fuming quantity are measured to judge the fireproof property of the test piece on a basis of acceptable standard values shown in the following Table 1.

Further, the annexed test of the laminate is carried out under the same conditions as described above, except that three holes of 2.5 cm diameter are pierced from front of the test piece to rear side thereof in place. In this case, the evaluation of the term "crack/deformation" is omitted.

TABLE 1

| Test | Acceptable standard values of Grade 2 incombustibility (quasi-incombustible material) according to JIS A-1321 combustion test | | | |
|---|---|---|---|---|
| Item<br>Class | Heat release value<br>(°C. × min.) | Fuming factor | Time of lingering flame (sec.) | Crack/ deformation |
| Surface test | not more than 100 | not more than 60 | not more than 30 | no harmful degree |
| Annexed test | not more than 150 | not more than 60 | not more than 90 | — |

EXAMPLE 1, COMPARATIVE EXAMPLE 1

Laminates were manufactured by using the following production process from the compounding recipe of the following Table 2.

TABLE 2

| Ingredients | Parts by weight |
|---|---|
| Crude diphenylmethane diisocyanate (1) | 100 |
| Polypropylene glycol (2) | 13.97 |
| Solution of 20 wt. % potassium acetate in dipropylene glycol (3) | 4.0 |
| N,N',N''-tris(dimethylaminopropyl)sym-hexahydrotriazine (4) | 0.5 |
| SH-192 (5) | 1.0 |

TABLE 2-continued

| Ingredients | Parts by weight |
|---|---|
| Trichloromonofluoromethane (6) | 28 |

Note:
(1) Sumidur 44 V-20 (trade name) made by Sumitomo Bayer Urethane Co., Ltd.; isocyanate equivalent = 137
(2) PP-2000 (trade name) made by Sanyo Kasei Kogyo Co., Ltd.; hydroxyl equivalent = 1,000
(3) The solution is abbreviated as AcOK/DPG hereinafter.
(4) Polycat 41 (trade name) made by Abbott Laboratories.
(5) organopolysiloxane-polyoxyalkylene copolymer, made by Toray Silicone Co., Ltd.
(6) The compound is abbreviated as F-11 hereinafter.

A laminate with a total thickness of 25 mm was manufactured by using the urethane modified polyisocyanurate foam of the compounding recipe of Table 2 as the core material, aluminum foils with a thickness of 0.05 mm as the front and back surface materials and glass victoria lawn WK 2020 A100 made by Nittobo Co., Ltd. (thickness 0.07 mm, weight 55 g/m$^2$) as the glass fiber to be lain at the interface between the core material and the front surface material. For the comparison, a laminate including no glass victoria lawn was manufactured in the same manner as described above.

First of all, the glass victoria lawn was adhered to the front surface material of aluminum foil with a thickness of 0.05 mm through about 0.5 g of an adhesive (Viron 200, trade name, made by Toyobo Co., Ltd.), cut into a square with 36 cm of length and width, and then set in an aluminum mold with 36 cm of length and width heated to about 60° C. While, the back surface material of aluminum foil with a thickness of 0.05 mm was placed in an upper mold cover having the same size as described above and heated to about 60° C.

The ingredients other than the crude diphenylmethane diisocyanate in Table 2 were weighed in a stainless beaker of 500 ml capacity and thoroughly mixed to form a homogeneous solution. To this solution was added the crude diphenylmethane diisocyanate separately weighed in a stainless beaker of 200 ml capacity and then the resulting mixture was immediately stirred at a high speed for about 6 seconds to obtain a foam forming composition. Next, the composition was cast into the aluminum mold, on which was then placed the upper mold cover through a spacer of 25 mm thick and fixed thereto by means of a clamp. After the completion of the foaming, the assembly was heated in an oven at a temperature of about 70° C. for 20 minutes to effect the curing and then the resulting laminate was taken out from the assembly.

The laminate including no glass victoria lawn as a comparative example was also manufactured in the same manner as described above.

The thus obtained laminates were examined according to JIS A-1321 combustion test to obtain results relating to the fireproof property of Grade 2 incombustibility as shown in the following Table 3. It can be seen from the results of Table 3 that the fireproof property of the laminate according to the invention is considerably improved as compared with that of Comparative Example 1.

TABLE 3

| | | Example 1 | | Comparative Example 1 | |
|---|---|---|---|---|---|
| | Class | Surface test | Annexed test | Surface test | Annexed test |
| | Foam density (g/cm$^3$) | 0.0298 | 0.0308 | 0.0288 | 0.0293 |
| JIS-A-1321 combustion | Heat release value (Td$\theta$) | 0 | 0 | 0 | 3.8 |
| | Fuming factor (C$_A$) | 49.2 | 42.2 | 63.6 | 60.6 |

TABLE 3-continued

|  | | Example 1 | | Comparative Example 1 | |
|---|---|---|---|---|---|
| | Class | Surface test | Annexed test | Surface test | Annexed test |
| test | Crack/deformation | none/small | — | none/small | — |
| | Time of lingering flame (sec.) | 14 | 31 | 34 | 50 |
| | Judgement | acceptable | | unacceptable | |

Figure 1:
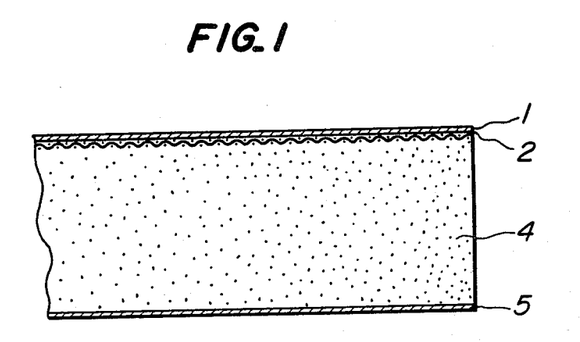
FIGS. 1 and 2 are fragmentary sectional views of embodiments of the fireproof laminate according to the invention, respectively.

The fireproof laminate of Example 1 comprises a front surface material 1 of an aluminum foil, a woven glass fiber 2 adhered to the front surface material, a core material 4 of a urethane modified polyisocyanurate foam, and a back surface material 5 of an aluminum foil as shown in FIG. 1.

EXAMPLES 2–3

Laminates with a total thickness of 20 mm were manufactured in the same manner as described in Example 1 by using a compounding recipe shown in the following Table 4 and changing the kind of the glass fiber to be used. In the following Table 5 are shown evaluation results relating to Grade 2 incombustibility according to JIS A-1321 combustion test.

TABLE 4

| Ingredients | Parts by weight |
|---|---|
| Sumidur 44V-20 | 100 |
| PP-2000 | 7.57 |
| diethylene glycol (7) | 8.8 |
| Solution of 33 wt. % potassium acetate in diethylene glycol (8) | 1.2 |

TABLE 4-continued

| Ingredients | Parts by weight |
|---|---|
| 2,4,6-tris(dimethylamino-methyl)phenol (9) | 0.5 |
| L-5340 (10) | 1.0 |
| trichloromonofluoromethane | 25 |

Note:
(7) The compound is abbreviated as DEG hereinafter
(8) The solution is abbreviated as AcOK/DEG hereinafter.
(9) DMP-30 (trade name), made by Rohm & Hass Co., Ltd.
(10) organopolysiloxane-polyoxyalkylene copolymer, made by Nippon Unicar Co., Ltd.

TABLE 5

| | | Example 2 | | Example 3 | |
|---|---|---|---|---|---|
| Surface material (front/back) | | Aluminum foil of 0.05mm thick / Aluminum foil of 0.05mm thick | | Aluminum foil of 0.05mm thick / Aluminum foil of 0.05mm thick | |
| | Glass fiber | WK . 2010D100 (11) (thickness 0.08mm, 35g/m$^2$) | | WK . 2020A100 (thickness 0.07mm, 55g/m$^2$) | |
| | Class | Surface test | Annexed test | Surface test | Annexed test |
| JIS-A-1321 combustion test | Foam density (g/cm$^3$) | 0.0307 | 0.0302 | 0.0293 | 0.0303 |
| | Heat release value (Td$\theta$) | 0 | 0 | 0 | 0 |
| | Fuming factor (C$_A$) | 52.8 | 44.3 | 36.6 | 38.6 |
| | Crack/deformation | none/small | — | none/small | — |
| | Time of lingering flame (sec.) | 21 | 39 | 17 | 42 |
| | Judgement | acceptable | | acceptable | |

Note:
(11) Glass victoria lawn, made by Nittobo., Ltd.

EXAMPLES 4–8

Laminates with a total thickness of 25 mm were manufactured in the same manner as described in Example 1 by using the same compounding recipe as shown in Table 4, except that aluminum foils with a thickness of 0.03 mm were used as the front and back surface materials, respectively and various matted or woven glass fibers were used. In the following Table 6 are shown evaluation results relating to Grade 2 incombustibility according to JIS A-1321 combustion test.

TABLE 6(a)

| | | Example 4 | | Example 5 | |
|---|---|---|---|---|---|
| | Glass fiber | Glass victoria lawn WK-2020A 100 (thickness 0.07mm, 55g/m$^2$) | | Glass victoria lawn WK-2010D 100 (thickness 0.08mm, 35g/m$^2$) | |
| | Class | Surface test | Annexed test | Surface test | Annexed test |
| JIS-A-1321 combustion test | Foam density (g/cm$^3$) | 0.0286 | 0.0299 | 0.0291 | 0.0286 |
| | Heat release value (Td$\theta$) | 0 | 0 | 0 | 0 |
| | Fuming factor (C$_A$) | 45.0 | 41.6 | 39.3 | 39.7 |
| | Crack/deformation | none/small | — | none/small | — |
| | Time of lingering flame (sec.) | 0 | 20 | 11 | 18 |
| | Judgement | acceptable | | acceptable | |

TABLE 6(b)

|  |  | Example 6 | | Example 7 | |
| --- | --- | --- | --- | --- | --- |
|  | Glass fiber | Glass victoria lawn KC-1010B 104EV$_2$ (12) (thickness 0.24mm, 75g/m$^2$) | | Glass victoria lawn KC-0505B 104EV$_2$ (13) (thickness 0.3mm, 45g/m$^2$) | |
| JIS-A-1321 combustion test | Class | Surface test | Annexed test | Surface test | Annexed test |
|  | Foam density (g/cm$^3$) | 0.0289 | 0.0294 | 0.0291 | 0.0300 |
|  | Heat release value (Td$\theta$) | 0 | 2.5 | 36.3 | 11.3 |
|  | Fuming factor (C$_A$) | 45.9 | 39.4 | 41.7 | 43.5 |
|  | Crack/deformation | none/small | — | none/small | — |
|  | Time of lingering flame (sec.) | 17 | 31 | 23 | 43 |
|  | Judgement | acceptable | | acceptable | |

Note:
(12) trade name, made by Nittobo Co., Ltd.
(13) trade name, made by Nittobo Co., Ltd.

TABLE 6(c)

|  |  | Example 8 | |
| --- | --- | --- | --- |
|  | Glass Fiber | Filament Mat MF-30P-104 (14) (thickness about 0.2mm, 30g/m$^2$) | |
| JIS-A-1321 combustion test | Class | Surface test | Annexed test |
|  | Foam density (g/cm$^3$) | 0.0291 | 0.0303 |
|  | Heat release value (Td$\theta$) | 0 | 0 |
|  | Fuming factor (C$_A$) | 48.9 | 46.4 |
|  | Crack/deformation | none/small | — |
|  | Time of lingering flame (sec.) | 10 | 29 |
|  | Judgement | acceptable | |

(14) trade name, made by Nittobo Co., Ltd.

EXAMPLES 9–12

Laminates were manufactured under the same conditions as described in Examples 4–8, except that the total thickness was 20 mm and the kind of the glass fiber to be used was changed.

In the following Table 7 are shown evaluation results retaining to Grade 2 incombustibility according to JIS A-1321 combustion test.

TABLE 7(a)

|  |  | Example 9 | | Example 10 | |
| --- | --- | --- | --- | --- | --- |
|  | Glass Fiber | Glass victoria lawn WK-2020A 100 (thickness 0.07mm, 55g/m$^2$) | | Glass victoria lawn WK-2010D 100 (thickness 0.08mm, 35g/m$^2$) | |
| JIS-A-1321 combustion test | Class | Surface test | Annexed test | Surface test | Annexed test |
|  | Foam density (g/cm$^3$) | 0.0304 | 0.0309 | 0.0312 | 0.0301 |
|  | Heat release value (Td$\theta$) | 0 | 0 | 0 | 0 |
|  | Fuming factor (C$_A$) | 25.5 | 34.6 | 32.7 | 36.2 |
|  | Crack/deformation | none/small | — | none/small | — |
|  | Time of lingering flame (sec.) | 14 | 21 | 12 | 24 |
|  | Judgement | acceptable | | acceptable | |

TABLE 7(b)

|  |  | Example 11 | | Example 12 | |
| --- | --- | --- | --- | --- | --- |
|  | Glass fiber | Glass victoria lawn KC-1010B 104EV$_2$ (thickness 0.24mm, 75g/m$^2$) | | Filament Mat MF-30P-104 (thickness about 0.2mm, 30g/m$^2$) | |
| JIS-A-1321 combustion test | Class | Surface test | Annexed test | Surface test | Annexed test |
|  | Foam density (g/cm$^3$) | 0.0293 | 0.0300 | 0.0313 | 0.0320 |
|  | Heat release value (Td$\theta$) | 3.8 | 5.0 | 0 | 0 |
|  | Fuming factor (C$_A$) | 51.3 | 43.4 | 46.2 | 42.3 |
|  | Crack/deformation | none/small | — | none/small | — |
|  | Time of lingering flame (sec.) | 19 | 33 | 22 | 30 |
|  | Judgement | acceptable | | acceptable | |

COMPARATIVE EXAMPLES 2–8

For the comparison, laminates with a total thickness of 25 mm were manufactured by using the same compounding recipe for the urethane modified polyisocyanurate foam of the core material as shown in Table 4 and aluminum foils with a thickness of 0.03 mm as the front and back surface materials in such a manner that the glass fiber to be used was disposed in a center portion of the core material toward its thickness direction or at the interface between the core material and the back surface material or uniformly dispersed into the core material.

The manufacture of the laminate was carried out in the same manner as described in Example 1. If it is intended to dispose the glass fiber at the center portion of the core material, a spacer of 12.5 mm thick was placed on the mold and then the glass fiber was fixed thereto under a tension state in the transverse direction. If it is intended to dispose the glass fiber at the interface between the core material and the back surface material, it was adhered to the back surface material through fiber as the glass fiber, is uniformly dispersed into the core material.

TABLE 8(a)

|  |  | Comparative Example 2 | Comparative Example 3 | Comparative Example 4 | Comparative Example 5 |
| --- | --- | --- | --- | --- | --- |
|  | Glass fiber | Glass victoria lawn WK-2010D 100 (thickness 0.08mm, 35g/m$^2$) | Glass victoria lawn WK-2010D 100 (thickness 0.08mm, 35g/m$^2$) | Glass victoria lawn KC-1010B 104 EV$_2$ (thickness 0.24mm, 75g/m$^2$) | Glass victoria lawn KC-1010B 104 EV$_2$ (thickness 0.24mm, 75g/m$^2$) |
| Position of glass fiber |  | center portion in thickness direction | interface between core material and back surface material | center portion in thickness direction | interface between core material and back surface material |
| JIS-A-1321 combustion test | Class | Surface test | Surface test | Surface test | Surface test |
|  | Foam density (g/cm$^3$) | 0.0291 | 0.0294 | 0.0317 | 0.0302 |
|  | Heat release value (Td$\phi$) | 0 | 0 | 0 | 0 |
|  | Fuming factor (C$_A$) | 48.9 | 32.7 | 49.2 | 39.9 |
|  | Crack/deformation | none/small | none/small | none/small | none/small |
|  | Time of lingering flame (sec.) | 42 | 46 | 75 | 69 |
|  | Judgement | unacceptable | unacceptable | unacceptable | unacceptable |

TABLE 8(b)

|  |  | Comparative Example 6 | Comparative Example 7 | Comparative Example 8 |
| --- | --- | --- | --- | --- |
|  | Glass fiber | Filament Mat MF-30P-104 (thickness 0.2mm, 30g/m$^2$) | Filament Mat MF-30P-104 (thickness 0.2mm, 30g/m$^2$) | Glass powder PFB-101[15] 10 parts added to 100 parts of Sumidur 44V-20 |
| Position of glass fiber |  | center portion in thickness direction | interface between core material and back surface material | uniformly dispersed into core material |
| JIS-A-1321 combustion test | Class | Surface test | Surface test | Surface test |
|  | Foam density (g/cm$^3$) | 0.0302 | 0.0299 | 0.0319 |
|  | Heat release value (Td$\phi$) | 0 | 0 | 0 |
|  | Fuming factor (C$_A$) | 37.2 | 42.3 | 66.3 |
|  | Crack/deformation | none/small | none/small | none/small |
|  | Time of lingering flame (sec.) | 49 | 105 | 68 |
|  | Judgement | unacceptable | unacceptable | unacceptable |

Note
[15]trade name, made by Nittobo Co., Ltd.

an adhesive in the same manner as described in Example 1. If it is intended to uniformly disperse the glass fiber into the core material, the glass fiber was previously mixed with the ingredients other than Sumidur 44V-20 in Table 4.

In the following Table 8 are shown evaluation results of the surface test relating to Grade 2 incombustibility according to JIS A-1321 combustion test.

From the results of Table 8, it is obvious that when the glass fiber is disposed at a position different from the invention, the resulting laminates become unacceptable for Grade 2 incombustibility because the time of lingering flame is considerably long as compared with those of the corresponding Examples 4, 5 and 8. And also, it is obvious that the fireproof property is very poor even when the glass powder, which is similar to the short

EXAMPLES 13-18

Laminates with a total thickness of 20 mm were manufactured in the same manner as described in Example 1 by using a coated aluminum foil with a thickness of 0.03 mm as the front surface material, an aluminum foil with a thickness of 0.03 mm as the back surface material and a glass victoria lawn WK-2010D 100 as the glass fiber, except that the compounding recipe of urethane modified polyisocyanurate foam as the core material was changed.

In the following Table 9 are shown the compounding recipe of urethane modified polyisocyanurate foam and evaluation results relating to Grade 2 incombustibility according to JIS A-1321 combustion test.

TABLE 9(a)

|  | Example 13 | | Example 14 | | Example 15 | |
| --- | --- | --- | --- | --- | --- | --- |
| Compounding recipe | PP-2000 | 10.77 | PP-2000 | 7.57 | PP-2000 | 2.99 |
|  | DPG | 4.8 | DPG | 8.0 | DEG | 13.38 |
|  | AcOK/DPG | 2.0 | AcOK/DPG | 2.0 | AcOK/DEG | 1.2 |
| Coating thickness 18) (mm) | 0.021 | | 0.020 | | 0.019 | 0.019 |
| JIS-A-1321 Class | Surface test | Annexed test | Surface test | Annexed test | Surface test | Annexed test |

TABLE 9(a)-continued

|  |  | Example 13 | | Example 14 | | Example 15 | |
|---|---|---|---|---|---|---|---|
| combustion test | Foam density (g/cm$^3$) | 0.0343 | 0.0335 | 0.0322 | 0.0318 | 0.0295 | 0.0292 |
|  | Heat release value (Td$\theta$) | 0 | 0 | 0 | 0 | 0 | 0 |
|  | Fuming factor (C$_A$) | 37.2 | 36.5 | 33.0 | 35.9 | 45.3 | 40.2 |
|  | Crack/deformation | none/small | — | none/small | — | none/small | — |
|  | Time of lingering flame (sec.) | 25 | 31 | 18 | 41 | 0 | 28 |
|  | Judgement | acceptable | | acceptable | | acceptable | |

Note:
Common compounding conditions
DMP-30 0.5
L-5340 1.0
F-11 25
Sumidur 44V-20 100

TABLE 9(b)

|  |  | Example 16 | | Example 17 | | Example 18 | |
|---|---|---|---|---|---|---|---|
| Compounding recipe | | FA-702 (16) | 7.57 | PTG-500 (17) | 7.57 | PP-2000 | 7.57 |
|  |  | DEG | 8.8 | DEG | 8.8 | tripropylene |  |
|  |  | AcOK/DPG | 1.2 | AcOK/DEG | 1.2 | glycol | 4.8 |
|  |  |  |  |  |  | DEG | 4.0 |
|  |  |  |  |  |  | AcOK/DEG | 1.2 |
| Coating thickness[18] (mm) | | 0.018 | 0.020 | 0.019 | 0.019 | 0.020 | 0.019 |
| JIS-A-1321 | Class | Surface test | Annexed test | Surface test | Annexed test | Surface test | Annexed test |
| combustion test | Foam density (g/cm$^3$) | 0.0305 | 0.0299 | 0.0303 | 0.0311 | 0.0316 | 0.0320 |
|  | Heat release value (Td$\theta$) | 0 | 0 | 0 | 0 | 0 | 0 |
|  | Fuming factor (C$_A$) | 27.6 | 35.4 | 50.7 | 44.6 | 30.9 | 40.0 |
|  | Crack/deformation | none/small | — | none/small | — | none/small | — |
|  | Time of lingering flame (sec.) | 25 | 29 | 18 | 35 | 18 | 31 |
|  | Judgement | acceptable | | acceptable | | acceptable | |

(16) addition polyol of pentaerythritol with ethylene oxide and propylene oxide, hydroxyl equivalent = 1516, trade name, made by Sanyo Kasei Kogyo Co., Ltd.
(17) polytetramethylene glycol, hydroxyl equivalent = 1000, trade name, made by Nippon Polyurethane Co., Ltd.
(18) Acryl lacquer (cream) paint, Air Rock, trade name, made by Rock Paint Co., Ltd.

EXAMPLES 19-21, COMPARATIVE EXAMPLE 9

Laminates including various front surface materials were manufactured by using the following production process from the compounding recipe of the following Table 10.

TABLE 10

| Ingredients | Parts by weight |
|---|---|
| Crude diphenylmethane diisocyanate[1] | 100 |
| polypropylene glycol[2] | 7.57 |
| diethylene glycol | 8.8 |
| Solution of 33 wt. % potassium acetate in diethylene glycol[3] | 1.2 |
| 2,4,6-tris(dimethylaminomethyl)-phenol[4] | 0.5 |
| L-5340[5] | 1.0 |
| trichloromonofluoromethane[6] | 28 |
| Weight ratio of low molecular weight diols to high molecular weight polyols = 1.27 | |
| Total amount of polyols used (parts by weight) = 17.17 | |

Note:
[1]Sumidur 44V-20 (trade name) made by Sumitomo Bayer Urethane Co., Ltd., isocyanate equivalent = 137
[2]PP-2000 (trade name) made by Sanyo Kasei Kogyo Co., Ltd., hydroxyl equivalent = 1,000
[3]The solution is abbreviated as AcOK/DEG hereinafter.
[4]DMP-30 (trade name) made by Rohm & Hass Co., Ltd.
[5]organopolysiloxane-polyoxyalkylene copolymer, made by Toray Silicone Co., Ltd.
[6]The compound is abbreviated as F-11 hereinafter.

The laminates with a total thickness of 20 mm were manufactured by using the urethane modified polyisocyanurate foam of the compounding recipe of Table 10 as the core material and various front surface materials composed of the three-layer assembly except that the kind of the glass fiber as the middle layer was changed. In this three-layer assembly, the upper layer was an aluminum foil of 0.03 mm thick coated with a vinyl chloride-vinyl acetate paint of about 15μ thick (Almac V8 F-4-332, made by Dainichi Seika Co., Ltd.), the lower layer was an aluminum foil of 0.007 mm thick and these aluminum foils were bonded to each other through the glass fiber by means of a polyester adhesive (Adcoat 527, made by Toyo Ink Co., Ltd.). For the comparison, a laminate was manufactured by using a front surface material exclusive of the glass fiber in the same manner as described above.

First of all, the front surface material was cut into a square with 36 cm of length and width and then set in an aluminum mold of 36 cm of length and width heated to about 50° C. While, the aluminum foil of 0.05 mm thick as the back surface material was placed in an upper mold cover having the same size as described above and heated to about 50° C.

The ingredients other than the crude diphenylmethane diisocyanate in Table 10 were weighed in a stainless beaker of 500 ml capacity and thoroughly mixed to form a homogeneous solution. To this solution was added the crude diphenylmethane diisocyanate separately weighed in a stainless beaker of 200 ml capacity and then the resulting mixture was immediately stirred at a high speed for about 6 seconds to obtain a foam forming composition. Next, this composition was cast into the aluminum mold, on which was then placed the upper mold cover through a spacer of 20 mm thick and fixed thereto by means of a clamp. After the completion of the foaming, the assembly was heated in an oven at a temperature of about 70° C. for 20 minutes to effect the curing and then the resulting laminate was taken out from the assembly.

In the following Table 11 are shown the kind of the front surface material and evaluation results relating to Grade 2 incombustibility according to JIS A-1321 combustion test.

From the results of Table 11, it can be seen that the fireproof property of the laminate according to the invention is considerably superior to that of Comparative Example 9 using the front surface material exclusive of the glass fiber.

Figure 2:
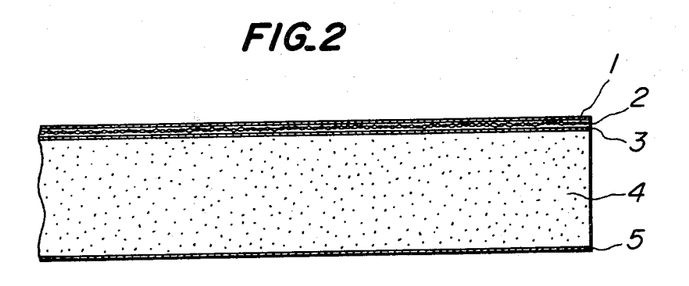

The fireproof laminate of Example 19 comprises a front surface material having a three-layer structure composed of an aluminum foil 1, a woven glass fiber 2 such as glass victoria lawn and an aluminum foil 3, a urethane modified polyisocyanurate foam (core material) 4, and a back surface material 5 of an aluminum foil as shown in FIG. 2.

TABLE 11(a)

| | | Example 19 | | Example 20 | |
|---|---|---|---|---|---|
| Front surface material (upper layer/middle layer/lower layer) | | Aluminum foil of 0.03mm thick (vinyl chloride-vinyl acetate paint of 15μ thick, cream) Glass victoria lawn WK-2020A[1] Aluminum foil of 0.007mm thick | | Aluminum foil of 0.03mm thick (vinyl chloride-vinyl acetate paint of 15μ thick, cream) Glass victoria lawn KC-1010B[2] Aluminum foil of 0.007mm thick | |
| JIS-A-1321 combustion test | Class | Surface test | Annexed test | Surface test | Annexed test |
| | Foam density (g/cm³) | 0.0277 | 0.0274 | 0.0253 | 0.0261 |
| | Heat release value (Tdθ) | 0 | 0 | 0 | 0 |
| | Fuming factor ($C_A$) | 0.3 | 24.6 | 0.6 | 28.5 |
| | Crack/deformation | none/small | — | none/small | — |
| | Time of lingering flame (sec.) | 0 | 21 | 0 | 19 |
| | Judgement | acceptable | | acceptable | |

Note:
[1] made by Nittobo Co., Ltd., thickness 0.07 mm, weight 55 g/m²
[2] made by Nittobo Co., Ltd., thickness 0.24 mm, weight 75 g/m²

TABLE 11(b)

| | | Example 21 | | Comparative Example 9 | |
|---|---|---|---|---|---|
| Front surface material (upper layer/middle layer/lower layer) | | Aluminum foil of 0.03mm thick (vinyl chloride-vinyl acetate paint of 15μ thick, cream) Glass paper[3] Aluminum foil of 0.007mm thick | | Aluminum foil of 0.03mm thick (vinyl chloride-vinyl acetate paint of 15μ thick, cream) None Aluminum foil of 0.007mm thick | |
| JIS-A-1321 combustion test | Class | Surface test | Annexed test | Surface test | Annexed test |
| | Foam density (g/cm³) | 0.0274 | 0.0269 | 0.0276 | 0.0275 |
| | Heat release value (Tdθ) | 0 | 0 | 0 | 0 |
| | Fuming factor ($C_A$) | 0.3 | 30.9 | 55.5 | 38.4 |
| | Crack/deformation | none/small | — | none/small | — |
| | Time of lingering flame (sec.) | 0 | 25 | 45 | 39 |
| | Judgement | acceptable | | unacceptable | |

Note:
[3] made by Undernach Co. Ltd., thickness 0.4mm, weight 50 g/m²

EXAMPLES 22–23

Laminates with a foam thickness of 20 mm were manufactured in the same manner as described in Example 19 by using the same compounding recipe as used in Examples 19–21 except that an aluminum foil coated with a different paint or an embossed aluminum foil was used as the upper layer for the front surface material.

In the following Table 12 are shown the kind of the front surface material and evaluation results relating to Grade 2 incombustibility according to JIS A-1321 combustion test.

TABLE 12

| | | Example 22 | | Example 23 | |
|---|---|---|---|---|---|
| Front surface material (upper layer/middle layer/lower layer) | | Aluminum foil of 0.03mm thick (acrylic resin paint[4] of 10μ thick, cream) Glass victoria lawn WK-2020A Aluminum foil of 0.007mm thick | | Embossed aluminum foil of 0.03mm thick (vinyl chloride-vinyl acetate paint of 15μ thick, cream) Glass victoria lawn WK-2020A Aluminum foil of 0.007mm thick | |
| JIS-A-1321 combustion test | Class | Surface test | Annexed test | Surface test | Annexed test |
| | Foam density (g/cm³) | 0.0265 | 0.0271 | 0.0271 | 0.0266 |
| | Heat release value (Tdθ) | 0 | 0 | 0 | 0 |
| | Fuming factor ($C_A$) | 1.8 | 26.7 | 0 | 30.0 |
| | Crack/deformation | none/small | — | none/small | — |
| | Time of lingering flame (sec.) | 0 | 12 | 0 | 16 |
| | Judgement | acceptable | | acceptable | |

Note:
[4] Air Rock, made by Rock Paint Co., Ltd.

EXAMPLES 24-25

Laminates with a foam thickness of 20 mm were manufactured in the same manner as described in Example 19 by using the same front surface material as used in Example 19 except that the compounding recipe for the urethane modified polyisocyanurate foam of the core material was changed.

In the following Table 13 are shown the compounding recipe and evaluation results relating to Grade 2 incombustibility according to JIS A-1321 combustion test.

From the results of Table 13, it can be seen that the fireproof property of the laminate according to the invention is not influenced by the change of the compounding recipe at all.

EXAMPLES 26-28, Comparative Example 10

Laminates with a foam thickness of 20 mm were manufactured in the same manner as described in Example 19 by changing the compounding recipe and the kind of the front surface material. For the comparison, a laminate was manufactured by using an asbestos paper in place of the glass fiber as the middle layer of the front surface material.

In the following Table 14 are shown the compounding recipe, the kind of the front surface material and evaluation results relating to Grade 2 incombustibility according to JIS A-1321 combustion test.

From the results of Table 14, it can be seen that when the asbestos paper is used as the middle layer of the front surface material, the resulting laminate becomes unacceptable for Grade 2 incombustibility.

TABLE 13(a)

|  | Example 24 |  | Example 25 |  |
| --- | --- | --- | --- | --- |
| Compounding recipe | Sumidur 44V-20 | 100 | Sumidur 44V-20 | 100 |
|  | PP-2000 | 4.37 | PP-2000 | 10.77 |
|  | dipropylene glycol | 11.2 | dipropylene glycol | 4.8 |
|  | Solution of 20 wt. % potassium acetate in dipropylene glycol | 2.0 | Solution of 20 wt. % potassium acetate in dipropylene glycol | 2.0 |
|  | 2,4,6-tris(dimethyl-aminomethyl)phenol | 0.5 | 2,4,6-tris(dimethyl-aminomethyl)phenol | 0.5 |
|  | L-5340 | 1.0 | L-5340 | 1.0 |
|  | F-11 | 29 | F-11 | 29 |
| Weight ratio of low molecular weight diol to high molecular weight polyol |  | 2.92 |  | 0.59 |
| Total amount of polyols used |  | 17.17 |  | 17.17 |

TABLE 13(b)

|  |  | Example 24 |  | Example 25 |  |
| --- | --- | --- | --- | --- | --- |
|  |  | Surface test | Annexed test | Surface test | Annexed test |
| JIS-A-1321 combustion test | Class |  |  |  |  |
|  | Foam density (g/cm$^3$) | 0.0278 | 0.0270 | 0.0295 | 0.0295 |
|  | Heat release value (Td$\theta$) | 0 | 0 | 0 | 2.5 |
|  | Fuming factor ($C_A$) | 0.3 | 20.4 | 0 | 53.6 |
|  | Crack/deformation | none/small | — | none/small | — |
|  | Time of lingering flame (sec.) | 0 | 13 | 0 | 16 |
|  | Judgement | acceptable |  | acceptable |  |

TABLE 14(a)

|  |  | Example 26 |  | Example 27 |  |
| --- | --- | --- | --- | --- | --- |
| Compounding recipe |  | the same as used in Example 19 |  | the same as used in Example 19 |  |
| Front surface material (upper layer/middle layer/lower layer) |  | Aluminum foil of 0.03mm thick (vinyl chloride-vinyl acetate paint of 15μ thick, cream) Glass victoria lawn WK-2020A Aluminum foil of 0.015mm thick |  | Embossed aluminum foil of 0.03mm thick (vinyl chloride-vinyl acetate paint of 15μ thick, cream) Glass victoria lawn WK-2020A Aluminum foil of 0.015mm thick |  |
|  |  | Surface test | Annexed test | Surface test | Annexed test |
| JIS-A-1321 combustion test | Class |  |  |  |  |
|  | Foam density (g/cm$^3$) | 0.0265 | 0.0267 | 0.0268 | 0.0266 |
|  | Heat release value (Td$\theta$) | 0 | 0 | 0 | 0 |
|  | Fuming factor ($C_A$) | 0.6 | 21.9 | 0 | 24.3 |
|  | Crack/deformation | none/small | — | none/small | — |
|  | Time of lingering flame (sec.) | 0 | 19 | 0 | 17 |
|  | Judgement | acceptable |  | acceptable |  |

TABLE 14(b)

|  | Example 28 | Comparative Example 10 |
| --- | --- | --- |
| Compounding recipe | the same as used in Example 24 Embossed aluminum foil of 0.03mm thick (vinyl chloride-vinyl acetate paint of 15μ thick, cream) | the same as used in Example 19 Aluminum foil of 0.03mm thick (vinyl chloride-vinyl acetate paint of 15μ thick, cream) |

TABLE 14(b)-continued

|  | Example 28 | | Comparative Example 10 | |
|---|---|---|---|---|
| Front surface material (upper layer/middle layer/lower layer) | Glass victoria lawn WK-2020A Aluminum foil of 0.015 mm thick | | Asbestos paper W-3310[5] Aluminum foil of 0.015mm thick | |
| | Surface test | Annexed test | Surface test | Annexed test |
| JIS-A-1321 combustion test | | | | |
| Class Foam density (g/cm$^3$) | 0.0289 | 0.0290 | 0.0260 | 0.0267 |
| Heat release value (Td$\theta$) | 0 | 0 | 0 | 0 |
| Fuming factor (C$_A$) | 0 | 29.4 | 21.9 | 27.3 |
| Crack/deformation | none/small | — | none/small | — |
| Time of lingering flame (sec.) | 0 | 9 | 49 | 36 |
| Judgement | acceptable | | unacceptable | |

Note:
[5] made by Jujo Seishi Co., Ltd., thickness 0.27 mm, weight 250 g/m$^2$

EXAMPLES 29–32

Laminates with a foam thickness of 20 mm were manufactured in the same manner as described in Example 19 by using the same compounding recipe as used in Example 19 and glass victoria lawn WK-2020A as the glass fiber of the middle layer except that the thickness of aluminum foil as the upper and lower layers in the front surface material was changed.

In the following Table 15 are shown the kind of the front surface material and evaluation results relating to Grade 2 incombustibility according to JIS A-1321 combustion test.

TABLE 15(a)

|  | Example 29 | | Example 30 | |
|---|---|---|---|---|
| Front surface material (upper layer/middle layer/lower layer) | Aluminum foil of 0.03mm thick (vinyl chloride-vinyl acetate paint of 15μ thick, cream) Glass victoria lawn WK-2020A Aluminum foil of 0.03mm thick | | Aluminum foil of 0.03mm thick (vinyl chloride-vinyl acetate paint of 15μ thick, cream) Glass victoria lawn WK-2020A Aluminum foil of 0.05mm thick | |
| | Surface test | Annexed test | Surface test | Annexed test |
| JIS-A-1321 combustion test | | | | |
| Class Foam density (g/cm$^3$) | 0.0271 | 0.0276 | 0.0267 | 0.0266 |
| Heat release value (Td$\theta$) | 0 | 0 | 0 | 0 |
| Fuming factor (C$_A$) | 0 | 30.3 | 0 | 31.2 |
| Crack/deformation | none/small | — | none/small | — |
| Time of lingering flame (sec.) | 0 | 12 | 0 | 13 |
| Judgement | acceptable | | acceptable | |

TABLE 15(b)

|  | Example 31 | | Example 32 | |
|---|---|---|---|---|
| Front surface material (upper layer/middle layer/lower layer) | Aluminum foil of 0.05mm thick (vinyl chloride-vinyl acetate paint of 15μ thick, cream) Glass victoria lawn WK-2020A Aluminum foil of 0.007mm thick | | Aluminum foil of 0.08mm thick (vinyl chloride-vinyl acetate paint of 15μ thick, cream) Glass victoria lawn WK-2020A Aluminum foil of 0.007mm thick | |
| | Surface test | Annexed test | Surface test | Annexed test |
| JIS-A-1321 combustion test | | | | |
| Class Foam density (g/cm$^3$) | 0.0270 | 0.0272 | 0.0269 | 0.0271 |
| Heat release value (Td$\theta$) | 0 | 0 | 0 | 0 |
| Fuming factor (C$_A$) | 0 | 22.5 | 0 | 23.4 |
| Crack/deformation | none/small | — | none/small | — |
| Time of lingering flame (sec.) | 0 | 18 | 0 | 19 |
| Judgement | acceptable | | acceptable | |

What is claimed is:

1. A fireproof laminate comprising a urethane modified polyisocyanurate foam as a core material and a surface material piled on at least one side of the foam, which comprises:
   (1) an aluminum foil having a thickness of not less than 0.015 mm, as a surface material for said core material, said surface material being united with said core material by self-adhesion of said urethane modified polyisocyanurate foam; and
   (2) a matted or woven glass fiber interposed between said core material and said front surface material; said urethane modified polyisocyanurate foam being obtained by reacting an organic polyisocyanate with a polyol in the presence of an isocyanate trimerization catalyst, a blowing agent and other additives, provided that
   (1) said polyol being a combination of (a) a low molecular weight diol having a hydroxyl equivalent of not more than 100 selected from diethylene glycol, triethylene glycol, tetraethylene glycol, dipropylene glycol, tripropylene glycol, 2,3-butane diol and 2-butene-1,4-diol and (b) at least one high molecular weight polyol having a hydroxyl equivalent of 600–2,000 and 2 to 4 hydroxyl groups in its molecule;
   (2) the weight ratio of said low molecular weight diol to said high molecular weight polyols being 0.55 to 7.0; and
   (3) said polyol being used in a total amount of 12.5 to 25 parts by weight per 100 parts by weight of said organic polyisocyanate.

2. A fireproof laminate comprising a urethane modified polyisocyanurate foam as a core material and a surface material piled on at least one side of the foam, which comprises, as the surface material for said core material, a three-layer assembly composed of aluminum foils with a thickness of less than 0.1 mm as upper and lower layers and a matted or woven glass fiber as a middle layer, said surface material being united with said core material through said lower layer by self-adhesion of said foam; said urethane modified polyisocyanurate foam being obtained by reacting an organic polyisocyanate with a polyol in the presence of an isocyanate trimerization catalyst, a blowing agent and other additives, provided that

(1) said polyol being a combination of (a) a low molecular weight diol having a hydroxyl equivalent of not more than 100 selected from diethylene glycol, triethylene glycol, tetraethylene glycol, dipropylene glycol, tripropylene glycol, 2,3-butane diol and 2-butene-1,4-diol and (b) at least one high molecular weight polyol having a hydroxyl equivalent of 600–2,000 and 2 to 4 hydroxyl groups in its molecule;

(2) the weight ratio of said low molecular weight diol to said high molecular weight polyols being 0.55 to 7.0; and (3) said polyol being used in a total amount of 12.5 to 25 parts by weight per 100 parts by weight of said organic polyisocyanate.

3. A fireproof laminate as claimed in claim 1 or 2, wherein said organic polyisocyanate is an aromatic polyisocyanate.

4. A fireproof laminate as claimed in claim 1 or 2, wherein said organic polyisocyanate is a mixture of polymethylenepolyphenyl isocyanates having the following formula wherein n is 0 or an integer of 1 or more.

5. A fireproof laminate as claimed in claim 1 or 2, wherein said isocyanate trimerization catalyst is an alkali metal salt of a carboxylic acid having a carbon number of 2–12 alone or combination of a tertiary amino compound therewith.

6. A fireproof laminate as claimed in claim 1, wherein said aluminum foil to be used in said front surface material has a thickness of 0.015–0.2 mm.

7. A fireproof laminate as claimed in claim 1, wherein said matted or woven glass fiber has a thickness of not more than 2 mm.

8. A fireproof laminate as claimed in claim 2, wherein said aluminum foil as the upper layer has a thickness of 0.02–0.1 mm.

9. A fireproof laminate as claimed in claim 2, wherein said matted or woven glass fiber has a thickness of not more than 0.5 mm.

10. A fireproof laminate as claimed in claim 1 or 2, wherein said blowing agent is a low-boiling inert fluorinated and/or chlorinated organic compound.

11. A fireproof laminate as claimed in claim 1 or 2, wherein said blowing agent is trichloromonofluoromethane.

12. The fireproof laminate of claim 1 wherein said surface material consists essentially of said foil (1) and said glass fiber (2).

13. The fireproof laminate of claim 1 wherein said surface material consists of said foil (1) and said glass fiber (2).

14. The fireproof laminate of claim 1 wherein said laminate passes Grade 2 combustibility under JIS A-1321.

15. The fireproof laminate of claim 2 wherein said laminate passes Grade 2 combustibility under JIS A-1321.

* * * * *